United States Patent
Plumpe et al.

[11] 3,764,605
[45] Oct. 9, 1973

[54] 4-BENZENE SULPHONYL-1,1-[(1', 4'-ETHANO)-PENTAMETHYLENE] SEMICARBAZIDES

[75] Inventors: Hans Plumpe; Walter Puls, both of Wuppertal-Elberfeld, Germany

[73] Assignee: Bayer Aktiengesellschaft, Leverkusen, Germany

[22] Filed: Aug. 17, 1967

[21] Appl. No.: 661,198

[30] Foreign Application Priority Data
Aug. 22, 1966 Germany ............................ F 50003

[52] U.S. Cl...... 260/293.54, 424/267, 260/453 AR, 260/553 D, 260/553 DA, 260/594 C, 260/471 C, 260/155 A, 260/556 AR
[51] Int. Cl............................................. C07d 39/06
[58] Field of Search................................. 260/293.43, 260/293.47, 239.8, 293.54

[56] References Cited
UNITED STATES PATENTS
1,915,334  6/1933  Salzberg et al. .................... 260/243
2,075,359  3/1937  Salzberg et al. ........................ 167/22
3,372,164  3/1968  Haack et al.................... 260/293.43

Primary Examiner—Henry R. Jiles
Assistant Examiner—S. D. Winters
Attorney—Jacobs and Jacobs

[57] ABSTRACT

Arylsulphonyl-semicarbazides of the formula:

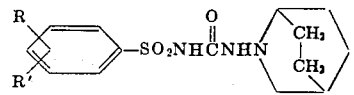

I wherein R and R' are the same or different and are each hydrogen, halogen, saturated or unsaturated lower alkyl, lower alkoxy, acyl, amino, acylamino or trifluoromethyl which may be substituted by halogen, hydroxy, lower alkoxy, amino or acylamino, exhibit a strong blood sugar depressant effect. A representative compound and a particularly effective one is 4-(p-toluolsulphonyl)1-,1-[(1', 4'-ethano)-pentamethylene]-semicarbazide. Processes for the production of the arylsulphonyl-semicarbazides I are disclosed.

7 Claims, No Drawings

4-BENZENE SULPHONYL-1,1-[(1',4'-ETHANO)-PENTAMETHYLENE] SEMICARBAZIDES

The present invention is concerned with arylsulphonyl-semicarbazides and their production. It is known in the art that arylsulphonyl-urea derivatives have a blood sugar depressant effect. In particular, N-(4-methyl-benzenesulphonyl)-N'-n-butyl-urea (Tolbutamide) has been recognized as a useful therapeutic agent by virtue of its blood sugar depressant properties and good pharmaceutical compatibility.

It has now been discovered, however, that arylsulphonyl-semicarbazides of the formula:

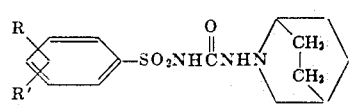

wherein R and R' are the same or different and are each hydrogen, halogen, saturated or unsaturated lower alkyl, lower alkoxy, acyl, acylamino or trifluoromethyl, which may be substituted by halogen, hydroxy, alkoxy, amino or acylamino, exhibit strong blood pressure depressant effects which are superior to Tolbutamide.

The arylsulphonyl-semicarbazides I may be produced by methods which are per se known. These methods include the following. 2-amino-2-aza-bicyclo-[2,2,2]-octane (N-amino-iso-quinuclidine) of the formula:

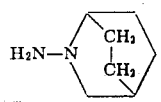

as such, or optionally in the form of a salt, is reacted either with an arylsulphonyl-isocyanate of the formula:

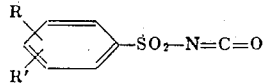

or with an arylsulphonyl compound of the formula:

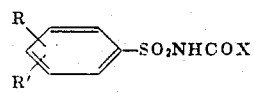

wherein R and R' are as defined above, and X is a radical which is eliminated during the reaction together with a hydrogen atom of the amino group to form a compound HX. X can, for example, be halogen, an azido, lower alkoxy, aryloxy, alkylmercapto, arylmercapto or, if desired, can be a substituted amino, cyclic amino or acylamino.

An alternative process for the production of compounds I comprising reacting arylsulphonamides of the formula:

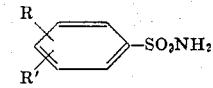

as such, or in the form of their alkali metal salts with a compound of the formula:

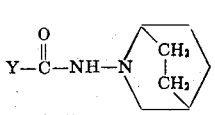

wherein R and R' are as defined above and Y is a radical which reacts during the course of the reaction with a hydrogen atom of the sulphonamide group or with the alkali metal atom of the corresponding sulphonamide alkali metal salt resulting in the elimination of HY or MY, wherein M is an alkali metal atom. Suitable groups of this type include halogen, azido, lower alkoxy, aryloxy, alkylmercapto, arylmercapto or, if desired, substituted amino, cyclic amino, acylamino or a group of the formula:

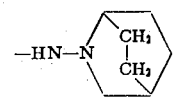

The processes may be carried out with or without a solvent or diluent. Depending on the reactivity of the compounds, the reaction is exothermic or it may be initiated or assisted by the application of heat. The final products are isolated by techniques known per se. The resulting products can be used as such or may be transformed into pharmaceutically acceptable, non-toxic salts which can then be used for administration.

EXAMPLE 1 a) N-nitroso-isoquinuclidine 111 g (1 mol) of isoquinuclidine are dissolved in 100 ml of concentrated hydrochloric acid (1.2 mol of HCl) and 300 ml of water and 76 g (1.1 mol) of sodium nitrite dissolved in 200 ml of water are added dropwise by stirring. The mixture is stirred after one-half hour at 20°C and after two hours at 75°C. After letting it stand overnight, the crystalates are filtered by suction, washed with water and dried in a vacuum dessicator. 84 g of brownish-yellow crystals are obtained, 140°C (Kofler heating block).

Further 5 g of the product are obtained by etherizing the mother liquor. Total yield is 89 g, 64 percent of theoretical (140 g).

b) N-aminoisoquinuclidine-hydrate.

To a suspension of 36.5 g (0.96 mol) lithium allanate in 960 ml absolute ether with the application of heat nitrogen is introduced together with 89.0 g (0.64 mol) of N-nitroisoquinuclidine in 800 ml of absolute ether added dropwise so that after removal of the heating source the mixture is boiling constantly. After four hours it is stirred under reflux, then 64 ml of ethyl acetate, 40 ml of water, 60 ml of 34 percent caustic soda and 160 ml of water are added dropwise. The formed residue is filtered by suction and washed with ether. The ether is distilled off, 200 ml of benzol added and again distilled. The residue boils at 90°/5 mm. A colorless, soft crystal substance is obtained which melts at approx. 50°C; 52.9 g are obtained which is 58 percent of theoretical (91.6 g), calculated as monohydrate.

c) 4-(p-toluolsulphonyl)-1,1-[(1',4'-ethano)-pentamethylene]-semicarbazide

To a solution of 7.2 g (0.05 mol) of N-aminoisoquinuclidine-hydrate in 25 ml of benzol, 9.9 g (0.05 mol) of p-toluolsulphonyl-isocyanate dissolved in 25 ml of benzol are added by stirring, whereby spontaneous heating occurs. Thereafter it is stirred under reflux for 10 minutes, cooled, the crystalate filtered off by suction, washed with benzol and recrystallized from ethyl acetate. Colorless crystals are obtained, 212°C (Decomposition and sublimation) (Kofler heating block), 6.7 g is 41 percent of theoretical (16.2 g).

EXAMPLE 2

4-(p-toluolsulphonyl)-1,1-[(1',4'-ethano)-pentamethylene]-semicarbazide 12.6 g (0.088 mole) of N-aminoisoquinuclidine-hydrate and 18.1 g (0.08 mol) of N-(p-toluolsulphonyl)-ethylurethane are heated in 50 ml of ethanol for an hour under reflux and thereafter the solvent is distilled off until the inside temperature reaches 120°C. The residue is recrystallized from ethyl acetate. Colorless crystals are obtained, 212°C (Decomposition and sublimation); (Kofler heating block), 11.8 g is 46 percent of theoretical (25.8 g).

EXAMPLE 3

4-benzolsulphonyl-1,1-[(1',4'-ethano)-pentamethylene]-semi-carbazide is obtained by the reaction of N-aminoisoquinuclidine-hydrate with benzolsulphonyl-isocyanate in a manner analogous to Example 1. Colorless crystals, 208°F (decomposition and sublimation are obtained.

EXAMPLE 4

Tests were conducted comparing a compound of formula I, namely 4-(p-toluolsulphonyl)-1,1-[(1',4'-ethano)-pentamethylene]-semicarbazide with Tolazamide for blood sugar depressant effect. Dogs which had fasted for 16 hours received 2.5, 5 and 10 mg/kg per os of 4-(p-toluolsulphonyl)-1,1-[(1',4'-ethano)-pentamethylene]-semicarbazide (FBa 5738) and Tolazamide. The blood sugar decrease was measured at 1 1/2, 3, 4 1/2 and 6 hours. The results show that to achieve the same blood sugar depressant effect achieved by 4-(p-toluolsulphonyl)-1,1-[(1',4'-ethano)-pentamethylene]-semicarbazide, Tolazamide had to be administered in twice the amount. Tolazamide is 4-(p-toluolsulphonyl)-1,1-hexamethylene semicarbazide.

BLOOD SUGAR IN PERCENTAGE OF INITIAL VALUE

| Mg./kg. per os | FBa 5738 | | | Tolazamide | | |
|---|---|---|---|---|---|---|
| | 2.5 | 5 | 10 | 2.5 | 5 | 10 |
| Hours of application: | | | | | | |
| 1½ | 69 | 60 | 57 | 70 | 57 | 55 |
| 3 | *75 | 64 | 57 | 86 | 70 | 62 |
| 4½ | *70 | **59 | **48 | 85 | 75 | 69 |
| 6 | 80 | **61 | *52 | 89 | 78 | 69 |

* and ** are the statistical probabilities of 95% and 99%, respectively, with which the corresponding values are secured.

Moreover, in the case of Tolazamide the $LD_{50}$ in rats is higher than 5 g/kg per os. On healthy, fasting experimental persons the blood sugar decreases in one hour 20 percent below the starting value after administration of 50 mg/Vp per os.

EXAMPLE 5

4-(p-fluorobenzene sulfonyl)-1,1-[(1',4'-ethano)-penta-methylene]-semicarbazide is obtained by the reaction of N-aminoisochinuclidine hydrate with 4-fluorobenzene sulfonyl isocyanate in the manner analogous to Example 1 c). Colourless crystalls, F. 214°C (decomp.).

EXAMPLE 5

4-(p-chlorobenzene sulfonyl)-1,1-[1',4'-ethano)-penta-methylene]-semicarbazide is obtained by the reaction of N-aminoisochinuclidine hydrate with 4-chlorobenzene sulfonyl isocyanate in the manner analogous to Example 1 c). Colourleass crystalls, F. 178°C (decomp.).

EXAMPLE 7

4{p-[β(2"-methoxy-5" - chlorobenzoylamino)ethyl] - benzene sulfonyl} - 1,1 - [(1',4' - ethano)pentamethylene] - semicarbazide. 21,3 g (0,05 mol) of N-[β-(2'-methoxy - 5" - chlorobenzoylamino)ethyl]benzene sulfonyl methylurethane and 7,2 g (0,05 mol) of N-aminoisochinuclidine hydrate are heated under reflux in 100 ml of toluene for four hours. After cooling the precipitate is filtered off with suction and washed with toluene. The crude product is heated once more with methanol, filtered off with suction and washed with methanol. A colouless finally crystalline powder is obtained. F. 190°C, Yield 15,6 g = 60 percent of the theoretical (26,0 g).

EXAMPLE 8

4[p-(β-benzoylaminoethyl) benzene sulfonyl]-1,1-[(1',4'-ethano-pentamethylene)]-semicarbazide is obtained by the reaction of N-aminoisochinuclidin hydrate and N-[4(β-benzoylaminoethyl)-benzene sulfonyl]-methyl urethane in the manner analogous to Example 6. Colourless crystals, F. 253°C (from methanol).

The table below shows the blood sugar depressent effect of 4-(p-fluorobenzene sulfonyl)-1,1-[(1',4'-ethano)-pentamethylene]-semicarbazide (I) and 4-(p-chlorobenzene sulfonyl)-1,1-[(1',4'-ethano)-pentamethylene]-semicarbazide (II) and 4 { - p - [β-(2"-methoxy-5" - chlorobenzoyl-amino)-ethyl]-benzene sulfonyl} - 1,1 - [(1',4'-ethano)-pentamethylene]-semicarbazide (III) in comparison with Tolazamide (IV) on intact rats which were fed at the beginning of the experiment.

TABLE.—BLOOD SUGAR IN PERCENT OF STARTING VALUES

|  | I | | II | | III | | IV | |
|---|---|---|---|---|---|---|---|---|
| Mg | 1 | 10 | 1 | 10 | 1 | 10 | 1 | 10 |
| Hours after administration: | | | | | | | | |
| 1½ | 76 | 68 | 84 | 53 | 52 | 44 | 97 | 57 |
| 3 | 80 | 77 | 83 | 62 | 67 | 64 | 100 | 86 |

For therapeutical purposes the active agent is administered per os in tablets or capsules. The active agent is applied in a dosage of, for example, with FB a 5738 25 mg to 250 mg, with III 2,5 to 25 mg per person.

Tablets

The finely pulverized active agent (FB a 5738) is thoroughly mixed with the requested additive and pressed into tablets so that each tablet contains the following substances:
  100 mg of FB a 5738
  100 mg of maize starch
  30 mg of secondary calcium phosphate
  19 mg of talcum
  1 mg of magnesium stearate Hard Gelatine Capsules The finely pulverized active agent (FB a 5738) is mixed with the requested additives and filled into capsules so that each capsule contains the following substances:
  100 mg of FB a 5738
  48 mg of secondary calcium phosphate
  2 mg of magnesium stearate

What is claimed is:

1. A compound of the formula:

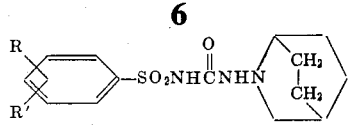

wherein R and R' are the same or different and are each hydrogen, halogen, lower alkyl, lower alkoxy, amino, trifluoromethyl, β-benzoylaminoethyl or β-(2''-methoxy-5''-chlorobenzoylamino)-ethyl, or a pharmaceutically acceptable, non-toxic salt thereof.

2. 4-(p-toluolsulphonyl)-1,1-[(1',4'-ethano)-pentamethylene]-semicarbazide.

3. 4-benzenesulphonyl-1,1-[(1',4'-ethano)-pentamethylene]-semicarbazide.

4. 4-(p-fluorobenzenesulphonyl)-1,1-[(1',4'-ethano)-pentamethylene]-semicarbazide.

5. 4-(p-chlorobenzenesulphonyl)-1,1-[(1',4'-ethano)-pentamethylene]-semicarbazide.

6. 4{-p-[β-(2''-methoxy-5''-chlorobenzoyl amino)-ethyl] - benzenesulphonyl} - 1,1 - [(1',4' - ethano) - pentamethylene]-semicarbazide.

7. A compound of the formula:

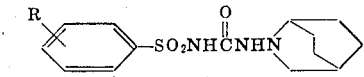

wherein R is a member selected from the group consisting of hydrogen, halogen, lower alkyl, lower alkoxy, trifluoromethyl, and amino.

* * * * *